(12) United States Patent
Heiss

(10) Patent No.: US 7,632,410 B2
(45) Date of Patent: Dec. 15, 2009

(54) UNIVERSAL WATER PURIFICATION SYSTEM

(76) Inventor: Christopher Heiss, 815 E. Monument St., Colorado Springs, CO (US) 80903

( * ) Notice: Subject to any disclaimer, the term of this patent is extended or adjusted under 35 U.S.C. 154(b) by 199 days.

(21) Appl. No.: 10/924,764

(22) Filed: Aug. 23, 2004

(65) Prior Publication Data

US 2005/0139530 A1    Jun. 30, 2005

Related U.S. Application Data

(60) Provisional application No. 60/497,244, filed on Aug. 21, 2003.

(51) Int. Cl.
*B01D 61/12* (2006.01)

(52) U.S. Cl. .............................. 210/637; 210/85; 210/87; 210/96.2; 210/143; 210/202; 210/192; 210/259; 210/641; 210/652; 210/739; 210/748; 210/760; 210/806; 210/900

(58) Field of Classification Search .................. 210/85, 210/87, 96.1, 96.2, 106, 143, 202, 205, 257.2, 210/259, 295, 321.69, 636, 641, 650, 652, 210/739, 748, 806, 900, 192, 637, 760
See application file for complete search history.

(56) References Cited

U.S. PATENT DOCUMENTS

| 4,169,789 A | 10/1979 | Lerat |
| 4,273,660 A | 6/1981 | Beitzel |
| 4,349,431 A | 9/1982 | Axenko et al. |
| 4,361,485 A | 11/1982 | Boonstra |
| 4,391,712 A | 7/1983 | Tyler et al. |
| 4,563,272 A * | 1/1986 | Yoshida et al. .............. 210/93 |
| 4,680,109 A | 7/1987 | Yamada et al. |
| 4,702,842 A | 10/1987 | Lapierre |
| 4,772,385 A | 9/1988 | Yamada et al. |
| 4,872,959 A | 10/1989 | Herbst et al. |
| 5,059,317 A | 10/1991 | Marius et al. |
| 5,236,595 A * | 8/1993 | Wang et al. .................. 210/669 |
| 5,244,579 A | 9/1993 | Horner et al. |
| 5,256,299 A * | 10/1993 | Wang et al. .................. 210/664 |
| 5,266,202 A | 11/1993 | Okonogi et al. |
| 5,272,091 A | 12/1993 | Egozy et al. |
| 5,385,653 A | 1/1995 | Tamarkin |
| 5,422,013 A | 6/1995 | Hirofuji |

(Continued)

OTHER PUBLICATIONS

W. Dickinson Burrows and Sara E. Renner, MCHB-TS-EWS (40) Medical Issues Information Paper No. IP31-017, "Biological Warfare Agents as Potable Water Threats," Water Supply Management Program, U.S. Army Center for Health Promotion and Preventive Medicine, Oct. 1998.

(Continued)

*Primary Examiner*—Joseph W Drodge
(74) *Attorney, Agent, or Firm*—Sheridan Ross P.C.

(57) ABSTRACT

A method of producing safe drinking water from virtually any water source utilizing a water purification system is disclosed. The method includes a combination of water purification methods with a control system that evaluates water quality and functional processing parameters, such as pressure and flow. The control system determines what water processing methods to utilize and how most efficiently to operate them. The system is capable of treating highly contaminated water to the necessary degree to produce safe drinking water. Furthermore, the system regulates and cleans itself to maintain functionality despite receiving high concentrations of various contaminants from the feed water source.

33 Claims, 2 Drawing Sheets

U.S. PATENT DOCUMENTS

| | | | |
|---|---|---|---|
| 5,494,573 | A | 2/1996 | Schoenmeyr et al. |
| 5,496,466 | A | 3/1996 | Gray |
| 5,501,798 | A | 3/1996 | Al-Samad et al. |
| 5,547,584 | A | 8/1996 | Capehart |
| 5,587,057 | A | 12/1996 | Metzler et al. |
| 5,589,066 | A | 12/1996 | Gray |
| 5,611,907 | A | 3/1997 | Herbst et al. |
| 5,647,973 | A | 7/1997 | Desaulniers |
| 5,725,758 | A | 3/1998 | Chace et al. |
| 5,741,416 | A | 4/1998 | Tempest, Jr. |
| 5,788,858 | A | 8/1998 | Acernese et al. |
| 5,897,780 | A | 4/1999 | Grabowski et al. |
| 5,972,216 | A | 10/1999 | Acernese et al. |
| 6,074,551 | A | 6/2000 | Jones et al. |
| 6,077,435 | A | 6/2000 | Beck et al. |
| 6,090,294 | A | 7/2000 | Teran et al. |
| 6,217,773 | B1 | 4/2001 | Graham |
| 6,328,896 | B1 | 12/2001 | Atnoor et al. |
| 6,398,965 | B1 * | 6/2002 | Arba et al. ............... 210/652 |
| 6,402,954 | B1 | 6/2002 | O'Keefe, Jr. |
| 6,488,835 | B1 | 12/2002 | Powell |
| 6,537,456 | B2 | 3/2003 | Mukhopadhyay |
| 6,607,668 | B2 * | 8/2003 | Rela ............... 210/321.6 |
| 6,613,201 | B1 | 9/2003 | Hecking |
| 6,613,202 | B2 | 9/2003 | Herbst et al. |
| 6,613,217 | B1 | 9/2003 | Gilmore |
| 6,651,383 | B2 | 11/2003 | Grott |
| 6,663,783 | B2 | 12/2003 | Stephenson et al. |
| 6,673,321 | B2 | 1/2004 | Weakly et al. |
| 6,679,988 | B2 | 1/2004 | Gsell |
| 6,689,271 | B2 | 2/2004 | Morkovsky et al. |
| 6,746,593 | B2 | 6/2004 | Herbst |
| 6,780,292 | B2 | 8/2004 | Hermann et al. |
| 6,783,687 | B2 | 8/2004 | Richard |
| 6,797,179 | B2 | 9/2004 | Arnaud |
| 6,800,206 | B2 | 10/2004 | Robinson |
| 6,849,178 | B2 | 2/2005 | Hecking |
| 6,866,757 | B2 | 3/2005 | Gilmore |
| 6,908,546 | B2 * | 6/2005 | Smith ............... 210/137 |
| 6,936,172 | B2 | 8/2005 | Hebert |
| 6,972,077 | B2 | 12/2005 | Tipton et al. |
| 2004/0007452 | A1 | 1/2004 | Warren et al. |
| 2005/0087484 | A1 | 4/2005 | Lambie |
| 2005/0121388 | A1 * | 6/2005 | Wood et al. ............... 210/636 |
| 2005/0230312 | A1 | 10/2005 | Chancellor |
| 2006/0060532 | A1 | 3/2006 | Davis |
| 2008/0087603 | A1 | 4/2008 | Heiss |

OTHER PUBLICATIONS

Technical Bulletin "Sanitary Control and Surveillance of Field Water Supplies," TB MED 577, NAVMED P-5010-9, Appendix D, AFOSH Standard 48-7, Departments of the Army, Navy and Air Force, Washington, D.C., Feb. 1999.

W. Dickinson Burrows and Jerry A. Valcik, Water Quality Information Paper No. IP-31-014 "Water Purification by Reverse Osmosis," Water Supply Management Program, U.S. Army Center for Health Promotion and Preventive Medicine, Draft Feb. 11, 1999.

Lozier et al., "Evaluation of Bioglogic and Non-Biologic Methods for Assessing Virus Removal by and Integrity of High Pressure Membrane Systems," American Water Works Association Membrane Technology Conference, 2003.

U.S. Appl. No. 12/168,886, filed Jul. 7, 2008, Heiss.

Burrows, et al., MCHB-TS-EWS (40), Medical Issues Information Paper No. 31-018, "Biological Warfare Agents in Drinking Water: Guide for Field Personnal", Water Supply Management Program, U.S. Army Center for Health Promotion and Preventive Medicine, Oct. 1998, pp. 1-33.

\* cited by examiner

UNIVERSAL WATER PURIFICATION SYSTEM

CROSS REFERENCE TO RELATED APPLICATIONS

This application claims priority to U.S. Provisional Patent Application Ser. No. 60/497,244, filed Aug. 21, 2003, which is incorporated herein in its entirety by this reference.

FIELD OF THE INVENTION

The invention resides in the field of water purification and specifically in methods of making and using water purification systems having self-regulation and cleaning functionality.

BACKGROUND OF THE INVENTION

The production of safe drinking water from contaminated source water has been practiced for many years. Traditionally, surface water is contaminated with particulate matter from contact with the earth and microorganisms from contact with wildlife. The salinity of water is highly variable from fresh water in streams to salt water in oceans. Common sources of water contamination include agricultural, industrial, and conflict activity.

Most communities have stationary water treatment facilities designed to produce safe drinking water from the source water to the community. Natural or man-made disasters can compromise the functionality of existing water treatment facilities requiring mobile water purification equipment be deployed for disaster relief by organizations such as the Red Cross. There are also many areas that are under developed and have no water treatment infrastructure. People living and working in these areas require a mobile water purification system to treat the available water source. The military is also a large user of mobile water purification systems.

Many systems have been developed to address the need for mobile water purification systems for use on source water of unknown and variable quality. However, the success of these systems has been limited. The first mobile systems developed simply filtered and chlorinated water. These systems were ineffective for treatment of salt water or chemically contaminated water. The next generation of mobile water purification systems utilized reverse osmosis to remove dissolved salts in sea water and provide some protection against chemical contamination. But, these systems fouled very quickly when they encountered turbid water. The most advanced systems currently available continue to have fouling problems, have limited ability to remove nuclear, biological, and chemical agents, and require highly trained operational personnel.

There has been fairly extensive evaluation of the performance of the Army's "ROWPU" (reverse osmosis water purification unit). There have also been several iterations of this device with different flow rates. Despite several design changes, the "ROPWU" units remain plagued by fouling problems. Additionally, it has been recognized that for several contaminants of concern, reverse osmosis alone is not adequate to provide sufficient removal. Therefore, add on filter cartridges have been employed to increase contaminant removal capability. U.S. Army document TB MED 77 provides documentation of how to operate its "ROPWU" units for maximum effectiveness. This involves an extensive chain of command with approval of the water source to be treated following analysis of the source water, evaluation of any threat of warfare agents, and operation of the units by highly trained personnel.

All the prior art mobile water purification systems have some deficiency. Deficiencies exist in resistance to fouling, contaminant removal capability, and operator intervention requirements. Unknown source water has a high potential to foul water purification equipment as it is likely that highly turbid water will be encountered. Many systems have inadequate particulate removal capability. For example, the use of a 5 micron cartridge filter prior to reverse osmosis. The reverse osmosis membrane has a very fine pore size of less than 0.005 microns. An abundance of particulate matter resides in the range of size difference between 5 and 0.005 microns including most microorganisms, fine sand or silt, and colloidal matter. Thus, the reverse osmosis membrane is easily fouled and the foulant is difficult to remove. Biofouling is particularly difficult to remove from membranes and is well documented as a common fouling problem in membrane systems. There is also potential for oil to be present in the water source which will readily foul membrane surfaces. Furthermore, all of the prior art systems rely on operator intervention to clean the fouled systems.

There are an abundance of contaminants that may be present in an unknown source water and must be removed for the water to be safe for human consumption. The US Environmental Protection Agency and the World Health Organization have established acceptable levels for many contaminants in drinking water. The military has evaluated some contaminants and determined maximum acceptable levels for short term exposure. These appear in the Tri Service Field Water Quality Standards. Establishment of acceptable contaminant levels for drinking water is an ongoing process and standards are regularly being revised by all of these organizations.

In 1998 the U.S. Army released Medical Issues Information Papers No. 31-017 and 31-018 discussing biological warfare agents and suggesting acceptable levels of these contaminants in drinking water. As noted in these papers, extremely low concentrations of certain biotoxins are highly toxic. They recommend acceptable levels in drinking water as low as $10^{-5}$ µg/L (for Staphylococcal Enterotoxins). Therefore it is clear that water purification equipment must provide very high reduction of concentration of contaminants to be able to effectively treat potential contaminants in the source water.

The U.S. Army has also evaluated the ability of reverse osmosis to remove a number of contaminants in its Water Quality Information Paper No. IP-31-014. Some contaminants are not removed well by reverse osmosis. It is also noted that reverse osmosis membranes may become compromised. A study was presented at the American Water Works Membrane Technology Conference in 2003 that evaluated the ability of reverse osmosis membranes to remove viruses under a number of conditions including the presence of a pinhole and torn O-ring seals. Compromising of the membrane or O-ring significantly lowers the rejection ability of the reverse osmosis element.

For a mobile water purification system to be highly effective at contaminant removal, it must provide more than one pass of reverse osmosis and a means of providing adequate removal of contaminants not removed well by reverse osmosis. Previously, systems have been described that typically operate with one pass of reverse osmosis, but can be set up to run two passes of reverse osmosis. The problem with this approach is that it relies on operator intervention to convert to two pass operation and provides no means of determining if and when two pass operation should be employed. Any additional treatment for contaminants not removed well by reverse osmosis may be provided by add on cartridges but again, this relies on operator intervention to determine when and if the add on cartridges are required. Furthermore, cartridges have limited capacity and no means are provided to determine if cartridge exhaustion is provided.

Thus, there is a need for a mobile water purification system that does not require highly trained operators and pre-screening of source water. To accomplish this, the mobile water purification system should be less sensitive to fouling and capable of removal of higher levels of contaminants. Preferably, reliance on disposable filter elements that may become quickly fouled would be avoided to minimize operator intervention requirements.

SUMMARY OF THE INVENTION

The invention herein described is a water purification system that does not have the deficiencies of the prior art systems. It is not plagued by fouling, adequately removes all potential contaminants, and does not require a highly trained operator.

The process consists of numerous water purification technologies including: particle barriers in several pore sizes, ultrafiltration membranes, reverse osmosis membranes, ultraviolet light, hydrocarbon adsorbent media, ozonation, chlorination, and dechlorination. The system requires minimal operator attention and does not need highly trained personnel to operate. The system is capable of deployment worldwide.

In one embodiment, the invention provides a water purification device including a screen having a pore size between about 30 microns and about 50 microns, at least one ultrafiltration membrane positioned to filter water exiting the screen, a first ultraviolet light source positioned to expose water exiting the ultrafiltration membrane to ultraviolet light, a first reverse osmosis membrane receiving water exposed to the ultraviolet light source coupled with a means of passing water through the reverse osmosis membrane, a first storage vessel that receives water from the first reverse osmosis membrane, a second reverse osmosis membrane receiving water from the storage vessel coupled with a means of passing water through the reverse osmosis membrane, a second storage vessel that receives water from the second reverse osmosis membrane, an ozone source positioned to contact water from the second storage vessel with ozone, a second ultraviolet light source positioned to expose water contacted with ozone from the ozone source to ultraviolet light; and a control system that monitors and regulates the movement of water through the water purification device. The water purification device may optionally have a means of passing water over the surface of the screen to dislodge accumulated particles on the surface of the screen as well as a means of passing water through the ultrafiltration membrane in a direction opposite to a flow of water through the water purification device to dislodge accumulated particles on the surface of the membrane.

The water purification device may contain other cleaning and control devices such as a means of scouring the first and the second reverse osmosis membranes with a cleaning solution such as an acid, or a base.

The water purification device may also include 5 micron filter cartridges and hydrocarbon absorbent cartridges positioned between the screen and the ultrafiltration membrane.

Preferably, the control system monitors and controls the flow of water through the entire water purification device in response to input from pressure detection and water quality monitors located throughout the water purification device.

Optionally, the water purification device contains means of recirculating water exposed to the ultraviolet light to the ozone source.

Optionally, the water purification device contains an injection system for injecting chlorine or a coagulant into water directed into the ultrafiltration membrane or an antiscalent into water directed into the first reverse osmosis membrane or sodium metabisulfate into water exposed to the first ultraviolet light source.

Optionally, the coagulant added to the water directed into the ultrafiltration membrane may be generated electrically in situ.

Preferably, the water purification device includes a means of monitoring chlorine concentration in water exposed to the first ultraviolet light and communicating those concentrations to the control system.

Another embodiment of the invention provides a method of purifying water that includes pumping water into the water purification device described above.

Another embodiment of the present invention is a water purification method that includes filtering water through a coarse screen to remove large debris, filtering the water through a screen having a pore size between about 30 microns and about 50 microns, ultrafiltration of the water through a membrane having a pore size between about 0.05 microns and about 0.1 micron, exposing the water to an ultraviolet light source, pumping the water through a first reverse osmosis system, pumping the water through a second reverse osmosis system, combining the water with ozone, exposing the water to ultraviolet light and mixing the water with chlorine.

DETAILED DESCRIPTION OF THE INVENTION

Figure 1:
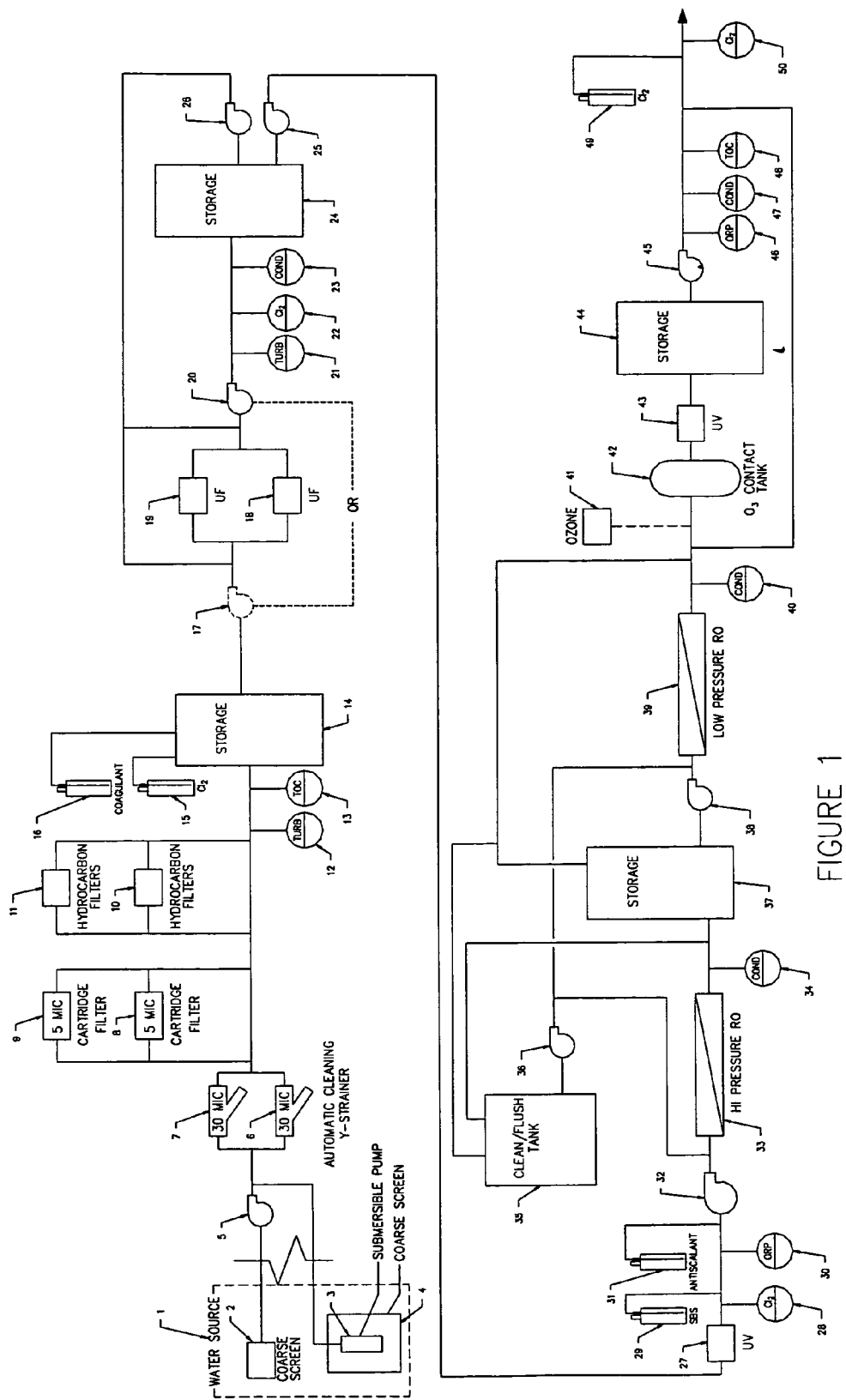
FIG. 1, shows a flow diagram of the water purification system of the present invention.

The present invention provides a water purification system incorporating numerous water purification technologies including particle barriers in several pore sizes, ultrafiltration membranes, reverse osmosis membranes, ultraviolet light, hydrocarbon adsorbent media, ozonation, chlorination, and dechlorination. FIG. 1 shows a process flow diagram for a preferred embodiment of the purification system.

Water is pumped into the treatment train from the water source (1). The rate of influent water flow is variable and maintained by the advanced control system (ACS). The system can utilize a stationary pump (5) with a suction-line placed into the water source or a portable submersible pump (3) that is placed into the water source. A very course screen (2,4) protects the inlet to the pump to prevent sticks and leaves and other large objects that could damage the pump form entering it. The pressurized water from the pump proceeds through a Y-type strainer with a pore size of 30-50 microns. Preferably, there are two strainers (6,7) plumbed in parallel. The Y strainers have automated valves on their purging ports that the ACS will open periodically and upon sensing an increase in pressure drop or decrease in flow due to restriction. During normal operation, only one strainer is on-line at a time. The ACS will route water flow to the parallel Y strainer in the event of clogging.

Following the Y strainer, there are two banks of cartridge filters having 5 micron pore size (8,9). These filters will only be on-line if the ACS determines that they are necessary based upon operational performance of downstream processes. One bank or the other will be placed on-line at a time.

Following the 5 micron cartridge filters, there are two banks of cartridge filters of hydrocarbon adsorptive media (10,11). These filters will only be on-line if the ACS determines that they are necessary based upon operational performance of downstream processes. One bank or the other will be placed on-line at a time.

The ACS will place the 5 micron and hydrocarbon adsorptive media cartridges on-line when the downstream UF exhibits an indication of fouling by oil as determined by operational changes or due to a rapid increase in total organic carbon (TOC) readings. The 5 micron cartridges protect the hydrocarbon adsorptive media cartridges from particle fouling.

Downstream of the piping to the hydrocarbon adsorptive media cartridge filters, there is a turbidity analyzer (12) and a total organic carbon (TOC) analyzer (13). The data from these analyzers is provided to the ACS and used to make operational determinations for the system. The level of influent turbidity determines duration between backwashes of the UF modules and chemical dosages. TOC levels determine the need for hydrocarbon adsorptive media and are used to measure percent reduction of TOC through the system.

Following the analyzers, chlorine (15) and coagulant (16) are injected. Optionally, the coagulant can be electrically generated in situ. Chlorine can also be generated electrically and piped to the injection pump reservoir. The ACS determines the level of chemical injection based on performance of downstream processes and downstream chlorine readings.

Following the chemical injection, the water proceeds into a storage reservoir (14). The ACS periodically purges the reservoir to evacuate accumulations of particulate matter. The storage reservoir feeds the ultrafiltration (UF) system. Ultrafiltration is the ideal pretreatment to reverse osmosis. The pore size of the UF membranes is in the range of about 0.05 to about 0.1 micron. This very fine filtration removes particles that could foul the reverse osmosis membranes including microorganisms. UF membranes are more durable than reverse osmosis membranes and can be backwashed. UF membranes are also resistant to chlorine. The UF system may utilize immersed or pressurized membrane modules. In the case of immersed modules, the storage reservoir (14) serves as the basin for module immersion. The UF system consists of UF modules (18,19), pumps (17, 20), valves, and sensors for pressure and flow. Pressurized modules utilize pump placement as shown in position 17. Immersed modules utilize pump placement as shown in position 20. The UF modules are arranged in two banks for a twin alternating configuration. The ACS determines the flux and recovery of the UF system based on the inlet turbidity and TOC data, combined with the flow and pressure data. The UF system automatically back flushes on a periodic basis determined by the ACS, utilizing the backwash/cleaning pump (26). If back flushes alone cannot sustain adequate flux, then the ACS will place the system into a cleaning process. There are three cleaning chemicals; acid, base, and chlorine. Each chemical is used for cleaning on a periodic basis, and different cleaning chemicals may be used in succession if the ACS determines that a particular cleaning was unsuccessful. The UF permeate water is accumulated in a tank (24). UF permeate is utilized for back flushing and cleaning of the UF modules. The performance of the UF system determines what pretreatment chemical injections are utilized as well as whether to bring the 5 micron and hydrocarbon adsorptive media cartridges on-line.

Following the UF modules, there are analyzers for turbidity (21), chlorine (22), and conductivity (23). The turbidity measurement verifies the integrity of the UF modules. The chlorine measurement determines when enough rinsing has occurred to reduce chlorine level low enough following a chlorine cleaning and pre UF chlorine injection rate. The conductivity measurement determines the processing mode of the downstream reverse osmosis system.

The UF permeate is pumped (25) from the UF permeate tank to the next processes of dechlorination and disinfection. A high intensity ultraviolet (UV) light (27) provides both dechlorination and disinfection. The light is sized at about 40-80 times disinfection dosage and is equipped with 185 nm bulbs. This dosage of UV light is adequate to destroy chlorine and also provides an extremely strong dose of disinfection. The UV light is equipped with an automatic wiper mechanism to keep the quartz sleeve free of deposits that could block the transmission of light. Optionally, the system can be equipped with a magnetic field generator in front of the UV light to promote ease of wiping hardness compounds from the quartz sleeve.

Following the UV light there is a chlorine analyzer (28). If residual chlorine exists following the UV light, sodium bisulfite (29) is injected into the water stream in an amount proportional to the chlorine level.

Following sodium bisulfite injection there is an oxidation reduction potential (ORP) sensor (30). This sensor verifies that adequate sodium bisulfite has been injected (if required). Following the ORP sensor is antiscalant injection (31). The ACS determines the injection rate of antiscalant based on performance of the downstream reverse osmosis system.

Following antiscalant injection, the water proceeds to a high pressure reverse osmosis pump (32). The ACS determines the operating pressure, flux, and recovery of the reverse osmosis system based on the influent water quality. The conductivity of the feed water to the reverse osmosis system is examined and categorized with specific ranges of conductivity dictating a desired recovery and flux. The ACS then computes a desired driving pressure. Therefore the reverse osmosis system operates appropriately on both sea water and fresh water. The discharge of the high pressure pump feeds the membrane modules (33). There is also an alternative feed to the membrane modules from another pump (36) that draws water from a reservoir of reverse osmosis permeate water (35). This is utilized to flush the membranes with reverse osmosis permeate water whenever the system stops processing water. This same water path also serves for automated cleaning of the reverse osmosis modules. The ACS determines when a cleaning cycle should be initiated based on flow and pressure data. There are two cleaning chemicals used; acid and base. Each chemical is used for cleaning on a periodic basis, and different cleaning chemicals may be used in succession if the ACS determines that a particular cleaning was unsuccessful.

The reverse osmosis permeate is collected in a tank (37). The conductivity of the reverse osmosis permeate is monitored (34) to verify integrity of the reverse osmosis modules and to determine the processing parameters for the next pass of reverse osmosis.

The accumulated reverse osmosis permeate is pumped (38) to another membrane bank (39) for a second pass through reverse osmosis. The second pass of reverse osmosis is not required to be capable of operating at as high a pressure as the first pass. The second pass is also operated at higher recovery than the first pass. Other than the lower pressure and higher recovery, the second pass operation is similar to the first pass, with integral cleaning and flushing capability controlled by the ACS.

The second pass reverse osmosis permeate can be routed back to the first pass reverse osmosis permeate tank (37) and therefore be recirculated to the inlet of the second pass reverse osmosis. The ACS will determine when the water is recirculated. The ACS can be placed in several threat modes. In the higher threat modes, the second pass reverse osmosis permeate is recirculated adequately to provide greater than two passes of reverse osmosis. Even during low threat mode operation, the water will be recirculated whenever it is not being demanded by downstream usage. Conductivity of the permeate from the second pass reverse osmosis is monitored (40) to insure integrity and evaluate overall percent reduction of conductivity.

The water then proceeds through an oxidation process. Light organic compounds that are not rejected well by reverse osmosis are destroyed in the oxidation process. The oxidation process is far superior to any cartridge filters for organic removal because there is no media to become exhausted. Therefore capacity is not limited. Because the water has already been through multiple passes of reverse osmosis there are no particles to protect compounds from oxidation or dissolved inorganic compounds to squander the oxidative capability of ozone and free hydroxyl radicals. Ozone is injected (41) into a contact chamber (42). Following the contact chamber it is passed through a UV light (43) with 185 nm bulbs. The combination of ozone and ultraviolet light generates free hydroxyl radicals providing high oxidative power. The water then proceeds to a final storage tank (44). The water is pumped (45) from this tank and analyzed for TOC (48), conductivity (47), and ORP (46) and can be recirculated through the ozone injection and UV light portions of the system, or proceed out of the system for use, as determined by the ACS based on percentage removal of TOC, final level of TOC, conductivity change, and ORP. Chlorine is injected (49) into the final product water to provide a residual disinfectant. The ACS determines the injection rate based on the measured value of chlorine as indicated by a chlorine analyzer (50).

Figure 2:
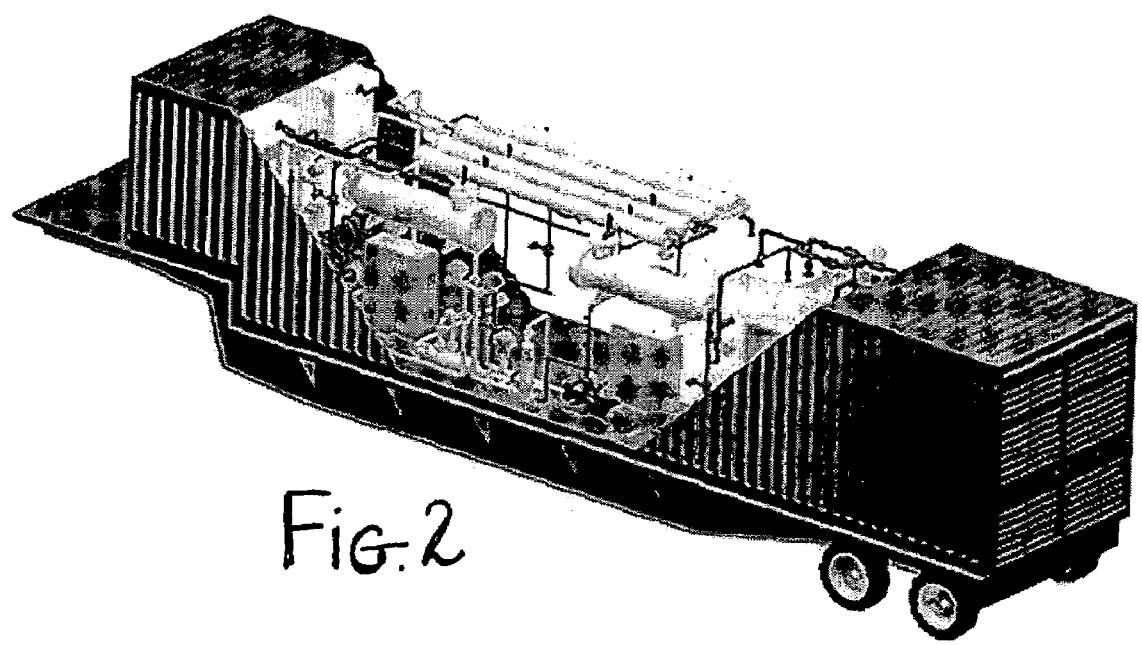
FIG. 2, shows one embodiment of the water purification of the present invention mounted in a modified ISO sea container.
Figure 3:
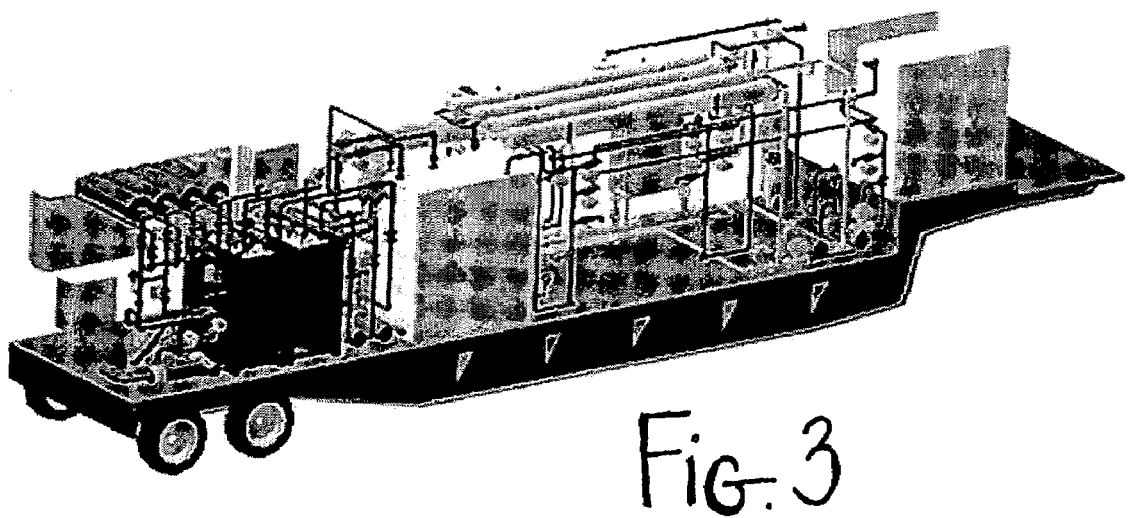
FIG. 3 shows one embodiment of the water purification of the present invention attached to a drop deck trailer.

The system is constructed to be mobile. It is containerized and temperature controlled. It is assembled to withstand shock and vibration. It may be provided with or without a generator. The system can be produced in a variety of flow rates that dictate the size of the system. FIGS. 2 and 3 show one embodiment of the system assembled in a modified ISO sea container and attached to a drop deck trailer. In this embodiment, the generator is placed on the remaining portion of the upper deck on the trailer.

What is claimed is:

1. A water purification device comprising:
   at least one ultrafiltration membrane positioned to receive water flowing from a water source;
   a first ultraviolet light source positioned to expose water exiting the at least one ultrafiltration membrane to ultraviolet light of intensity adequate to destroy chlorine;
   a first conductivity analyzer receiving water from the at least one ultrafiltration membrane and measuring conductivity prior to a reverse osmosis membrane;
   a first reverse osmosis membrane receiving water exposed to the ultraviolet light source coupled with a means of passing water through the reverse osmosis membrane wherein the conductivity measurement collected by the first conductivity analyzer determines operation of the first reverse osmosis membrane comprising operating pressure of the water passing through the membrane;
   a second conductivity analyzer receiving and analyzing conductivity of water from the first reverse osmosis membrane;
   a second reverse osmosis membrane receiving water from the first osmosis membrane with a means of passing water through the reverse osmosis membrane wherein the conductivity measurement collected by the second conductivity analyzer determines processing operation of the second reverse osmosis membrane comprising an operating pressure lower than that in the first reverse osmosis membrane;
   a second storage vessel that receives water from the second reverse osmosis membrane;
   an ozone source positioned to contact water from the second storage vessel with ozone;
   a second ultraviolet source positioned to expose water contacted with ozone from the ozone source to ultraviolet light; and
   a control system that monitors and regulates the movement of water through the water purification device.

2. The water purification device of claim 1, further comprising a means of passing water through the ultrafiltration membrane in a direction opposite to a flow of water through the water purification device to dislodge accumulated particles on the surface of the membrane.

3. The water purification device of claim 1, further comprising a means of scouring the first and the second reverse osmosis membranes with a cleaning solution.

4. The water purification device of claim 3, wherein the cleaning solution is selected from the group consisting of an acid, and a base.

5. The water purification device of claim 1, further comprising at least one 5 micron filter cartridge positioned between the screen water source and the ultrafiltration membrane.

6. The water purification device of claim 1, further comprising at least one hydrocarbon absorbent cartridge positioned between the screen water source and the ultrafiltration membrane.

7. The water purification device of claim 1, wherein the control system directs the flow of water through at least one 5 micron filter cartridge and at least one hydrocarbon absorbent cartridge positioned between the screen water source and the ultrafiltration membrane in response to a pressure differential detected across the ultrafiltration membrane.

8. The water purification device of claim 1, further comprising a means of recirculating water through the second reverse osmosis membrane.

9. The water purification device of claim 1, further comprising a means of recirculating water exposed to the second ultraviolet light to the ozone source.

10. The water purification device of claim 1, further comprising a means of detecting total organic carbon in water directed into the ultrafiltration membrane and in water exposed to the second ultraviolet light, wherein the control system compares values representing total organic carbon from these detecting means.

11. The water purification device of claim 1, further comprising an injection system for injecting at least one of chlorine and a coagulant into water directed into the ultrafiltration membrane.

12. The water purification system of claim 11, wherein the coagulant is electrically generated in situ.

13. The water purification device of claim 1, further comprising an injection system for injecting an antiscalent into water directed into the first reverse osmosis membrane.

14. The water purification device of claim 1, further comprising an injection system for injecting sodium metabisulfate into water exposed to the first ultraviolet light source.

15. The water purification device of claim 1, further comprising a means of monitoring chlorine concentration in water exposed to the first ultraviolet light source and communicating a chlorine concentration value to the control system.

16. The water purification device of claim 1, further comprising a water pump to pump a water source into the screen at least one ultrafiltration membrane.

17. The water purification device of claim 1, wherein the screen is further comprising a Y strainer screen between the water source and the at least one ultrafiltration membrane, wherein the Y strainer screen has having a pore size of at least about 30 microns and a purge port comprising an automated valve to pass water over the surface of the Y strainer screen to dislodge any accumulated particles on the surface of the screen.

18. The water purification device of claim 1, further comprising a turbidity analyzer in contact with water directed into the ultrafiltration membrane and in communication with the control system.

19. The water purification device of claim 1, further comprising a water pump capable of operating at pressures of about 1200 psi to direct water into the first reverse osmosis membrane.

20. A method of purifying water comprising pumping water into the water purification device of claim 1 and collecting an aqueous effluent.

21. The water purification device of claim 1, further comprising a means of scouring the ultrafiltration membrane with a cleaning solution selected from the group consisting of an acid, a base and chlorine.

22. The water purification device of claim 1, wherein the control system comprises a means of initiating a cleaning cycle in the water purification system in response to flow and pressure data.

23. The water purification device of claim 1, further comprising at least one of a turbidity analyzer and a total organic carbon analyzer, and wherein the control system directs the flow of water through at least one of a filter cartridge and a hydrocarbon absorbent cartridge positioned between the screen and the ultrafiltration membrane in response to signals from at least one of the turbidity analyzer and the total organic carbon analyzer.

24. A water purification method comprising the steps of:
filtering the water through a screen having a pore size of between about 30 microns and about 50 microns;
ultrafiltration of the water through a membrane having a pore size between about 0.05 microns and about 0.1 micron;
exposing the water to an ultraviolet light source of intensity sufficient to destroy chlorine;
analyzing the conductivity of water exposed to the ultraviolet light source;
pumping the water through a first reverse osmosis system under processing parameters modified by the conductivity of water exposed to the ultraviolet light source comprising operating pressure
analyzing the conductivity of water received from the first reverse osmosis system;
pumping the water through a second reverse osmosis system under processing parameters modified by the conductivity of water received from the first reverse osmosis system comprising an operating pressure lower that that of the first reverse osmosis system;
combining the water from the second reverse osmosis system with ozone; and
exposing the water containing ozone to ultraviolet light.

25. The method of claim 24, wherein flow rate of the water through each step is controlled by a control system.

26. The method of claim 25, wherein the control system monitors decline of water flow rate and increase of pressure drop after at least one step in the water purification method.

27. The method of claim 26, comprising the additional step of initiating alarms based on flow and pressure values monitored by the control system.

28. The method of claim 25 wherein the control system monitors water quality values selected from the group consisting of water conductivity, ORP, and total organic carbon content in the water.

29. The method of claim 28, comprising the additional step of recirculating water through at least one of the first reverse osmosis system, the second reverse osmosis system and the combining the water with ozone steps in the water purification method under the control of the control system.

30. The method of claim 25, wherein the control system controls discharge pressures of at least one water pump used to pump water through at least one step in the water purification method.

31. The method of claim 24, comprising the additional step of cleaning purification devices used in at least one step of the water purification method.

32. The method of claim 31, wherein the cleaning step comprises an action selected from the group consisting of purging screen filters, backwashing ultrafilters, cleaning ultrafilters, and cleaning reverse osmosis membranes.

33. The method of claim 24, comprising the additional steps of passing the water through 5 micron cartridge filters and passing the water through hyrdrocarbon adsorptive media following the filtering of water through a screen.

* * * * *

UNITED STATES PATENT AND TRADEMARK OFFICE
CERTIFICATE OF CORRECTION

PATENT NO. : 7,632,410 B2
APPLICATION NO. : 10/924764
DATED : December 15, 2009
INVENTOR(S) : Christopher Heiss It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 507 days.

Signed and Sealed this

Twenty-first Day of December, 2010

David J. Kappos
*Director of the United States Patent and Trademark Office*